(12) United States Patent
Abou Rjeily

(10) Patent No.: US 8,218,670 B2
(45) Date of Patent: Jul. 10, 2012

(54) METHOD OF SPACE TIME CODING WITH LOW PAPR FOR MULTIPLE ANTENNA COMMUNICATION SYSTEM OF THE UWB PULSE TYPE

(75) Inventor: Chadi Abou Rjeily, Byblos (LB)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 179 days.

(21) Appl. No.: 12/863,990

(22) PCT Filed: Jan. 29, 2009

(86) PCT No.: PCT/EP2009/050986
§ 371 (c)(1),
(2), (4) Date: Jul. 29, 2010

(87) PCT Pub. No.: WO2009/095430
PCT Pub. Date: Aug. 6, 2009

(65) Prior Publication Data
US 2010/0296550 A1    Nov. 25, 2010

(30) Foreign Application Priority Data
Jan. 31, 2008 (FR) .................. 08 50598

(51) Int. Cl.
*H04B 7/02* (2006.01)
*H04L 1/02* (2006.01)

(52) U.S. Cl. ........ 375/267; 375/299; 375/260; 375/347; 375/239; 455/500; 455/101

(58) Field of Classification Search .................. 375/267, 375/299, 260, 347, 239; 455/500, 101
See application file for complete search history.

(56) References Cited

U.S. PATENT DOCUMENTS
7,817,715 B2   10/2010   Abou Rjeily
(Continued)

OTHER PUBLICATIONS

Abou-Rjeily, Chadi et al., "On Space-Time Coding With Pulse Position and Amplitude Modulations for Time-Hopping Ultra-Wideband Systems", IEEE Transactions on Information Theory, IEEE, vol. 53, No. 7, pp. 2490-2509, XP011186163, ISSN: 0018-9448, (Jul. 1, 2007).

(Continued)

*Primary Examiner* — Phuong Phu
(74) *Attorney, Agent, or Firm* — Oblon, Spivak, McClelland, Maier & Neustadt, L.L.P.

(57) ABSTRACT

A method of space time coding for UWB transmission system including a plurality of radiative elements, the method coding a block of information symbols $S=(\sigma_1, \sigma_2, \ldots, \sigma_P)$ belonging to a M-PPM-M'-PAM modulation alphabet, as a sequence of vectors obtained from elements of the matrix:

$$C = \begin{pmatrix} \sigma_1 & \sigma_2 & \cdots & \sigma_P \\ \Omega\sigma_P & \sigma_1 & \ddots & \vdots \\ \vdots & \ddots & \ddots & \sigma_2 \\ \Omega\sigma_2 & \cdots & \Omega\sigma_P & \sigma_1 \end{pmatrix}$$

a row of the matrix corresponding to a use of the transmission channel and a column of the matrix corresponding to a radiative element, the matrix C being defined to within a permutation of its rows and/or its columns and $\Omega$ being defined as the combination of a permutation ($\omega$) of the modulation positions of the M-PPM alphabet and a symmetry operation ($\pi$) of the M'-PAM modulation alphabet for one of the modulation positions ($m_{\pm}$).

12 Claims, 4 Drawing Sheets

U.S. PATENT DOCUMENTS

| | | | |
|---|---|---|---|
| 7,974,361 B2 * | 7/2011 | Abou Rjeily | 375/267 |
| 8,059,709 B2 * | 11/2011 | Abou Rjeily | 375/239 |
| 8,059,710 B2 * | 11/2011 | Abou Rjeily | 375/239 |
| 2004/0202256 A1 * | 10/2004 | Giannakis et al. | 375/267 |
| 2007/0086509 A1 * | 4/2007 | Rjeily et al. | 375/130 |
| 2007/0237209 A1 * | 10/2007 | Rjeily | 375/130 |
| 2007/0280333 A1 * | 12/2007 | Abou Rjeily | 375/130 |
| 2008/0212720 A1 | 9/2008 | Abou Rjeily | |
| 2008/0232455 A1 | 9/2008 | Abou Rjeily | |
| 2009/0046774 A1 | 2/2009 | Abou Rjeily | |
| 2009/0103589 A1 | 4/2009 | Abou Rjeily | |
| 2009/0110050 A1 | 4/2009 | Abou Rjeily | |
| 2009/0225809 A1 | 9/2009 | Abou Rjeily | |
| 2010/0008403 A1 | 1/2010 | Abou Rjeily | |
| 2010/0008404 A1 | 1/2010 | Abou Rjeily | |
| 2010/0014561 A1 | 1/2010 | Abou Rjeily | |

OTHER PUBLICATIONS

Sethuraman, B. A. et al., "Full-Diversity, High-Rate Space-Time Block Codes From Division Algebras", IEEE Transactions on Information Theory, vol. 49, No. 10, pp. 2596-2616, XP011102239, ISSN: 0018-9448, (Oct. 1, 2003).

International Search Report issued Mar. 13, 2009 in PCT/EP09/050986 filed Jan. 29, 2009.

U.S. Appl. No. 12/293,666, filed Mar. 16, 2007, Abou Rjeily.

* cited by examiner

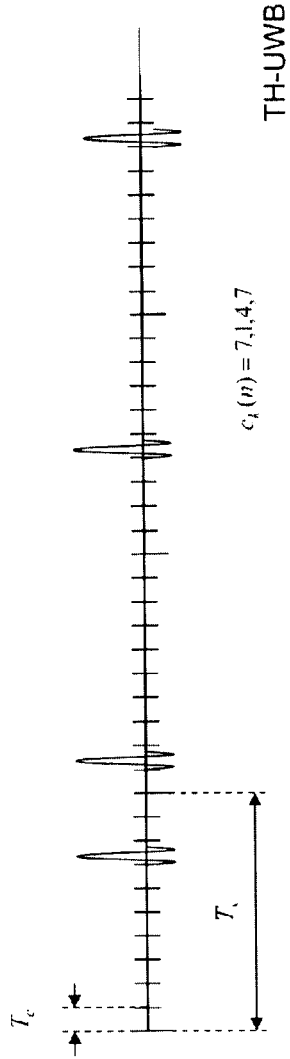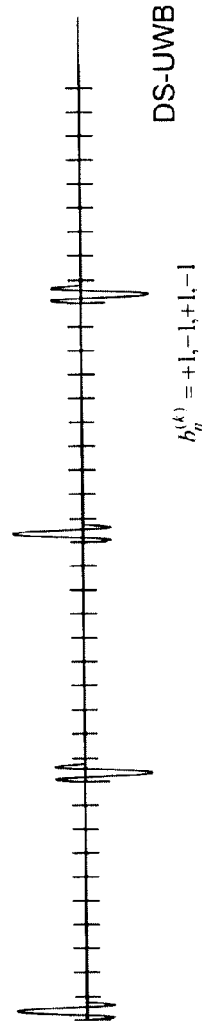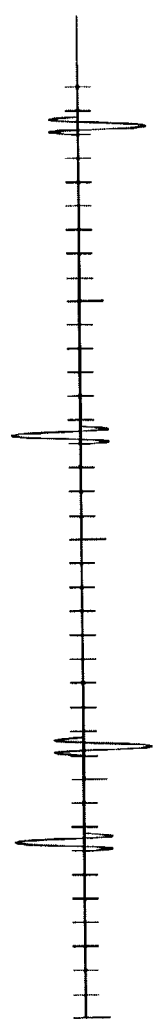

METHOD OF SPACE TIME CODING WITH LOW PAPR FOR MULTIPLE ANTENNA COMMUNICATION SYSTEM OF THE UWB PULSE TYPE

TECHNICAL FIELD

The present invention concerns both the field of ultra wide band (UWB) telecommunications and that of multiple antenna systems with space time coding (STC).

STATE OF THE PRIOR ART

Multiple antenna type wireless telecommunication systems are well known in the prior art. These systems use a plurality of antenna at emission and/or reception and are designated, depending on the type of configuration adopted, MIMO (multiple input multiple output), MISO (multiple input single output) or SIMO (single input multiple output). The same term MIMO will be employed hereafter to cover the abovementioned MIMO and MISO variants. The exploitation of the space diversity at emission and/or at reception enables these systems to offer channel capacities markedly superior to those of conventional single antenna systems (or SISO for single input single output). This space diversity is generally completed by a time diversity by means of a space time coding. In such coding, an information symbol to be transmitted is coded on several antennas and several transmission instants. Two major categories of space time coding MIMO systems are known: space time trellis coding or STTC systems and space time block coding or STBC systems. In a trellis coding system, the space time coder may be seen as a finite state machine supplying P transmission symbols to the P antennas as a function of the current state and the information symbol to be coded. Decoding on reception is performed by a multidimensional Viterbi algorithm, the complexity of which increases in an exponential manner as a function of the number of states. In a block coding system, a block of information symbols to be transmitted is coded as a matrix of transmission symbols, one dimension of the matrix corresponding to the number of antenna and the other corresponding to the consecutive transmission instants.

FIG. 1 schematically represents a MIMO transmission system 100 with STBC coding. A block of information symbols $S=(\sigma_1, \ldots, \sigma_b)$, for example a binary word of b bits or more generally of b M-ary symbols, is coded into a space time matrix:

$$C = \begin{pmatrix} c_{1,1} & c_{1,2} & \cdots & c_{1,P} \\ c_{2,1} & c_{2,2} & \cdots & c_{2,P} \\ \vdots & \vdots & \ddots & \vdots \\ c_{T,1} & c_{T,2} & \cdots & c_{T,P} \end{pmatrix} \quad (1)$$

where the coefficients $c_{t,p}$, $t=1, \ldots, T$; $p=1, \ldots, P$ of the code are as a general rule complex coefficients dependent on information symbols, P is the number of antennas used at the emission, T is an integer indicating the time extension of the code, in other words the number of per channel uses or PCUs.

The function $f$ which, at any vector S of information symbols, makes the word of space time code C correspond, is known as coding function. If the function $f$ is linear, the space time code is known as linear. If the coefficients $c_{t,p}$ are real, the space time code is known as real.

In FIG. 1, 110 designates a space time coder. At each instant of use of channel t, the coder provides to the multiplexer 120 the t-th row vector of the matrix C. The multiplexer transmits to the modulators $130_1, \ldots, 130_P$, the coefficients of the row vector and the modulated signals are transmitted by the antennas $140_1, \ldots, 140_P$.

The space time code is characterised by its diversity, which may be defined as the rank of the matrix C. There will be a maximum diversity if for any two code words $C_1$ and $C_2$ corresponding to two vectors $S_1$ and $S_2$, the matrix $C_1-C_2$ is of full rank.

The space time code is moreover characterised by its coding gain, which reflects the minimum distance between different words of the code. It may be defined as:

$$\min_{C_1 \neq C_2} \det((C_1 - C_2)^H (C_1 - C_2)) \quad (2)$$

or, in an equivalent manner, for a linear code:

$$\min_{C \neq 0} \det(C^H C) \quad (3)$$

where det(C) signifies the determinant of C and $C^H$ is the conjugated matrix transposed from C. For a transmission energy per information symbol, the coding gain is limited.

The higher the coding gain of a space time code, the more resistant it will be to fading.

The space time code is finally characterised by its rate, in other words by the number of information symbols that it transmits per instant of channel use. (PCU). The code is said to be at full rate if it is P times higher than the rate relative to a single antenna use (SISO). A code is known as single rate if it is identical to that relative to a single antenna use.

An example a space time code with maximum diversity and single rate for a MIMO system having any number of antennas has been proposed in the article of B. A. Sethuraman et al. entitled "Full-diversity, high-rate space time block codes from division algebras" published in IEEE Trans. on Information Theory, vol. 49, No 10, October 2003, pages 2596-2616. This code is defined by the following space time matrix:

$$\sigma_\gamma = \begin{bmatrix} \sigma_1 & \sigma_2 & \cdots & \sigma_P \\ \gamma\sigma_P & \sigma_1 & \ddots & \vdots \\ \vdots & \ddots & \ddots & \sigma_2 \\ \gamma\sigma_2 & \cdots & \gamma\sigma_P & \sigma_1 \end{bmatrix} \quad (4)$$

where $\sigma_1, \ldots, \sigma_P$, are information symbols, for example PAM symbols. For the space time code defined by the matrix (4) to be real, it is necessary that the coefficient $\gamma$ is itself real and if it is desired, moreover, not to increase the peak-to-average power ratio or PAPR compared to a single antenna system, this assumes that $\gamma=\pm 1$. However, the maximum diversity of the code is lost for $\gamma=1$ and is only attained for $\gamma=-1$ in the case where number of antennas P is a power of 2.

Another field of telecommunications is presently the subject of considerable research. It involves UWB telecommunication systems, anticipated in particular for the development of future wireless personal area networks (WPAN). These systems have the specificity of working directly in base-band with very wide band signals. UWB signal is generally taken to mean a signal complying with the spectral mask stipulated in the FCC regulation of the 14 Feb. 2002 and revised in March 2005, in other words essentially a signal in the spectral band 3.1 to 10.6 GHz and having a band width of at least 500 MHz to −10 dB. In practice, two types of UWB signals are known, multi-band OFDM signals (MB-OFDM) and pulse type UWB signals. Only the latter type will be discussed hereafter.

A pulse UWB signal is constituted of very short pulses, typically of around several hundreds of picoseconds, spread out within a frame. In order to reduce the multiple access interference (MAI), a separate time hopping (TH) code is assigned to each user. The signal coming from or going to a user k may then be written in the form:

$$s_k(t) = \sum_{n=0}^{N_s-1} w(t - nT_s - c_k(n)T_c) \quad (5)$$

where w is the form of the elementary pulse, $T_c$ is a chip time, $T_s$ is the time of an elementary interval with $N_s = N_c T_c$ where $N_c$ is the number of chips in an interval, the total frame being of time $T_f = N_s T_s$ where $N_s$ is the number of intervals in the frame. The time of the elementary pulse is chosen less than the chip time, i.e. $T_w \leq T_c$. The sequence $c_k(n)$ for $n=0, \ldots, N_s-1$ defines the time hopping code of the user k. The time hopping sequences are chosen so as to minimise the number of collisions between pulses belonging to time hopping sequences of different users.

A TH-UWB signal associated with a user k is represented in FIG. 2A. In order to transmit a given information symbol coming from or going to a user k, the TH-UWB signal is generally modulated by means of a position modulation (PPM for pulse position modulation), i.e. for the modulated signal:

$$s_k(t) = \sum_{n=0}^{N_s-1} w(t - nT_s - c_k(n)T_c - d_k\varepsilon) \quad (6)$$

where is modulation dither substantially less than the chip time $T_c$ and $d_k \in \{0, \ldots, M-1\}$ is the M-ary PPM position of the symbol.

Alternatively, the information symbols may be transmitted by means of an amplitude modulation (PAM). In this case, the modulated signal may be written:

$$s_k(t) = \sum_{n=0}^{N_s-1} a^{(k)}.w(t - nT_s - c_k(n)T_c) \quad (7)$$

where $\alpha^{(k)} = 2m'-1-M'$ with $m'=1, \ldots, M'$, is the M'-ary symbol of the PAM modulation. A BPSK modulation (M'=2) may for example be used.

The PPM and PAM modulations may also be combined in a M·M'-ary composite modulation. The modulated signal then has the following general form:

$$s_k(t) = \sum_{n=0}^{N_s-1} \sum_{m=0}^{M-1} a_m^{(k)}.w(t - nT_s - c_k(n)T_c - m\varepsilon) \quad (8)$$

The alphabet of this M-PPM-M'-PAM modulation of cardinal $Q = M \cdot M'$ has been represented in FIG. 3. For each of the M time positions, M' modulation amplitudes are possible. A symbol (μ, α) of this alphabet may be represented by a sequence $\alpha_m$, m=0, ..., M−1 with $\alpha_m = \delta(m-\mu)\alpha$ where μ is one position of the PPM modulation, α is one element of the M'-PAM alphabet and $\delta(\cdot)$ the Dirac distribution.

Instead of separating the different users by means of time hopping codes, it is also possible to separate them by orthogonal codes, for example Hadamard codes, as in DS-CDMA. One then refers to DS-UWB (direct spread UWB). In this case, one obtains for the expression of the non modulated signal, corresponding to (5):

$$s_k(t) = \sum_{n=0}^{N_s-1} b_n^{(k)} w(t - nT_s) \quad (9)$$

where $b_n^{(k)}$, n=0, ..., $N_s-1$ is the spread sequence of the user k. It will be observed that the expression (9) is analogous to that of a conventional DS-CDMA signal. It differs from it however by the fact that the chips do not occupy all of the frame but are spread out at the period. A DS-UWB signal associated with a user k is represented in FIG. 2B.

As previously, the information symbols may be transmitted by means of a PPM modulation, a PAM modulation or a composite PPM-PAM modulation. The amplitude modulated DS-UWB signal corresponding to the TH-UWB signal (7) may be expressed, in conserving the same notations:

$$s_k(t) = \sum_{n=0}^{N_s-1} a^{(k)} b_n^{(k)}.w(t - nT_s) \quad (10)$$

Finally, it is known to combine time hopping codes and spectral spread codes to offer multiple accesses to the different users. A TH-DS-UWB pulse UWB signal is thereby obtained of general form:

$$s_k(t) = \sum_{n=0}^{N_s-1} b_n^{(k)}.w(t - nT_s - c_k(n)T_c) \quad (11)$$

A TH-DS-UWB signal associated with a user k is represented in FIG. 2C. This signal may be modulated by a PPM-PAM M·M'-ary composite modulation. The following equation is then obtained for the modulated signal:

$$s_k(t) = \sum_{n=0}^{N_s-1} \sum_{m=0}^{M-1} a_m^{(k)} b_n^{(k)}.w(t - nT_s - c_k(n)T_c - m\varepsilon) \quad (12)$$

Using UWB signals in MIMO systems is known from the prior art. In this case, each antenna transmits a UWB signal modulated as a function of an information symbol or a block of such symbols (STBC).

The space time coding techniques initially developed for narrow band signals or for DS-CDMA apply poorly to pulse UWB signals. Indeed, known space time codes, such as those disclosed in the above-mentioned article of B. A. Sethuraman, are generally with complex coefficients and consequently carry a phase information. However, it is excessively difficult to recover this phase information in a signal with band as wide as that of pulse UWB signals.

The use of a real code, for example by choosing γ=±1 for the code defined in (4), may lead, as has been seen, to a loss of the maximum diversity. Conversely, conserving the property of maximum diversity may lead to the elements of the code (for example the elements of the matrix $\sigma_\gamma$ with $|\gamma|\neq 1$) to belong to an amplified and/or flipped modulation constellation compared to the constellation to which the information symbols belong, leading to a higher PAPR value than in the single antenna configuration.

The object of the present invention is to propose a real space time code that does not have the abovementioned drawbacks, particularly an increased level of PAPR compared to a single antenna configuration. A subsidiary object of the present invention is to propose such a code moreover having a maximum diversity whatever the number of antenna.

DESCRIPTION OF THE INVENTION

The present invention is defined by a method of space time coding for UWB transmission system comprising a plurality P of radiative elements, said method coding a block of information symbols $S=(\sigma_1, \sigma_2, \ldots, \sigma_P)$ belonging to a M-PPM-M'-PAM modulation alphabet with $M \geq 2$, as a sequence of vectors, the components of a vector being intended to position and amplitude modulate a pulse UWB signal for a given radiative element of said system and a use of transmission channel, each component of a vector corresponding to a PPM modulation position, according to which said vectors are obtained from the elements of the matrix:

$$C = \begin{pmatrix} \sigma_1 & \sigma_2 & \ldots & \sigma_P \\ \Omega\sigma_P & \sigma_1 & \ddots & \vdots \\ \vdots & \ddots & \ddots & \sigma_2 \\ \Omega\sigma_2 & \ldots & \Omega\sigma_P & \sigma_1 \end{pmatrix}$$

a row of the matrix corresponding to a use of the transmission channel and a column of the matrix corresponding to a radiative element, the matrix C being defined to within a permutation of its rows and/or its columns and Ω being defined as the combination of a permutation of the modulation positions of the M-PPM alphabet and a symmetry operation of the M'-PAM modulation alphabet for one of the modulation positions.

For example, said permutation operation is a circular permutation of said modulation positions, particularly a circular shift of said modulation positions.

According to one embodiment, the number P of radiative elements and the number M of modulation positions confirm $M-d(M) \geq P$ where $d(M)$ is defined by $d(M)=0$ in the case where M is a power of 2 and as the greatest divisor of M such that the ratio $M/d(M)$ is uneven, in the other cases.

According to an alternative, M'=1, the symbols $\sigma_1, \sigma_2, \ldots, \sigma_P$ belong to said M-PPM modulation alphabet. The symbols $\sigma_2, \ldots, \sigma_P$ may then occupy all of the modulation positions save that ($m_\pm$) to which said symmetry operation applies.

The radiative elements may be UWB antennas, laser diodes or light emitting diodes.

Said pulse signal may be a TH-UWB signal, a DS-UWB signal or a TH-DS-UWB signal.

The present invention also concerns a UWB transmission system comprising a plurality of radiative elements, comprising:

coding means to code a block of information symbols $S=(\sigma_1, \sigma_2, \ldots, \sigma_P)$ belonging to a M-PPM-M'-PAM modulation alphabet with $M \geq 2$, as a sequence of vectors, each vector being associated with a given use of the transmission channel and a radiative element, each component of a vector corresponding to a PPM modulation position, said vectors being obtained from elements of the matrix:

$$C = \begin{pmatrix} \sigma_1 & \sigma_2 & \ldots & \sigma_P \\ \Omega\sigma_P & \sigma_1 & \ddots & \vdots \\ \vdots & \ddots & \ddots & \sigma_2 \\ \Omega\sigma_2 & \ldots & \Omega\sigma_P & \sigma_1 \end{pmatrix}$$

a row of the matrix corresponding to a use of the transmission channel and a column of the matrix corresponding to a radiative element, the matrix C being defined to within a permutation of its rows and/or its columns and Ω being defined as the combination of a permutation of the modulation positions of the M-PPM alphabet and a symmetry operation of the M'-PAM modulation alphabet for one of the modulation positions;

a plurality of modulators to position and amplitude modulate a pulse UWB signal, each modulator being associated with a radiative element and position and amplitude modulating said signal, during a use of the transmission channel, by means of the components of the vector associated with said radiative element and with said use of the channel;

each radiative element being suited to emit the signal thereby modulated by said associated modulator.

According to one embodiment, the number P of radiative elements and the number M of modulation positions confirm $M-d(M) \geq P$ where $d(M)$ is defined by $d(M)=0$ in the case where M is a power of 2 and as the greatest divisor of M such that the ratio $M/d(M)$ is uneven, in the other cases.

BRIEF DESCRIPTION OF DRAWINGS

Other characteristics and advantages of the invention will become clear on reading a preferential embodiment of the invention and by referring to the appended figures, among which:

FIGS. 2A to 2C represent the respective forms of TH-UWB, DS-UWB and TH-DS-UWB signals;

DETAILED DESCRIPTION OF SPECIFIC EMBODIMENTS

The basic idea of the invention is to use information symbols belonging to a M-PPM-M'-PAM modulation constellation with $M \geq 2$ and $M' \geq 1$, and to construct a space time code from a permutation operation of the modulation positions of the M-PPM alphabet and a symmetry operation of the PAM alphabet.

A UWB transmission system with P transmission antennas and more generally, as will be seen hereafter, with P radiative elements will be considered hereafter. The space time code used by the system is defined, keeping the same notation conventions, by the following matrix, of dimension PM×P:

$$C = \begin{pmatrix} \sigma_1 & \sigma_2 & \cdots & \sigma_P \\ \Omega\sigma_P & \sigma_1 & \ddots & \vdots \\ \vdots & \ddots & \ddots & \sigma_2 \\ \Omega\sigma_2 & \cdots & \Omega\sigma_P & \sigma_1 \end{pmatrix} \quad (13)$$

where $\sigma_1, \sigma_2, \ldots, \sigma_P$ are the M-PPM-M'-PAM information symbols to be transmitted, represented in the form of column vectors of dimension M, the components of which are all zero with the exception of a single one belonging to the M'-PAM alphabet.

Generally speaking, any permutation on the rows (row is here taken to mean a row of vectors) and/or the columns of C is a space time code according to the invention, a permutation on the rows equivalent to a permutation of the instants of use of the channel (PCUs) and a permutation on the columns equivalent to a permutation of the transmission antennas.

Figure 1:
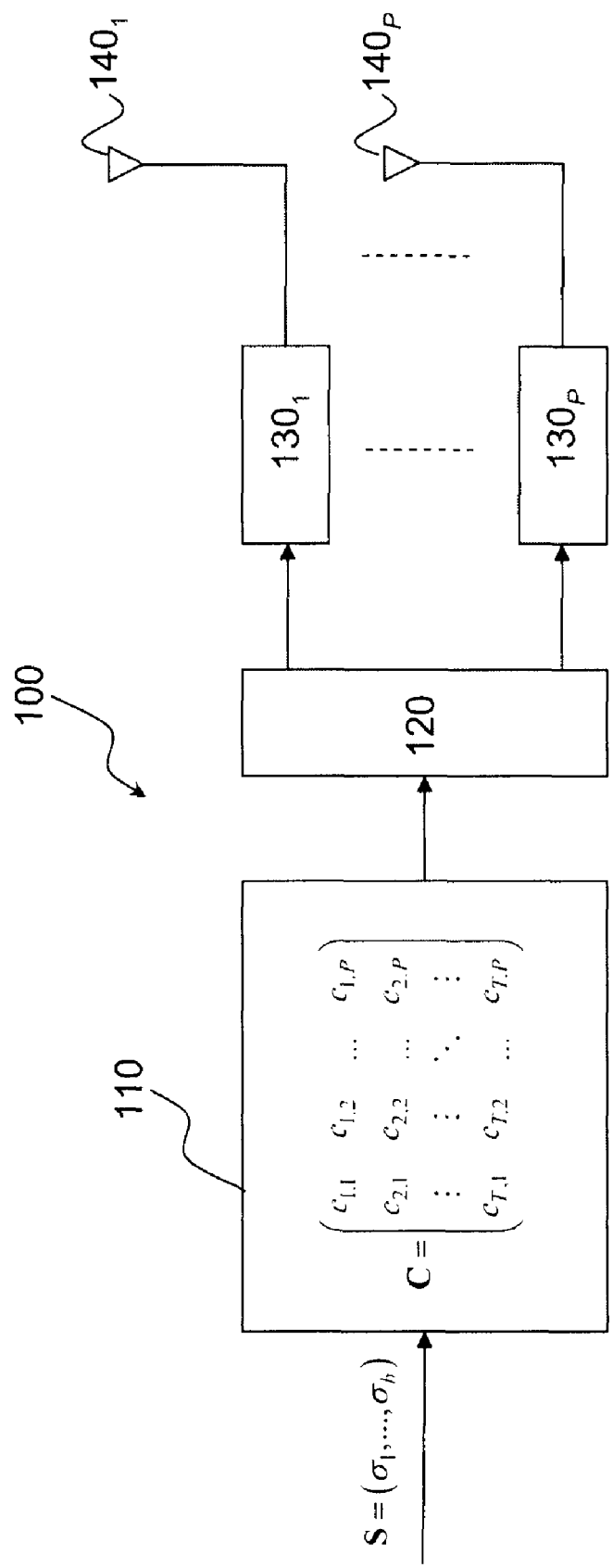
FIG. 1 schematically represents a MIMO transmission system with STBC coding known in the prior art.
Figure 3:
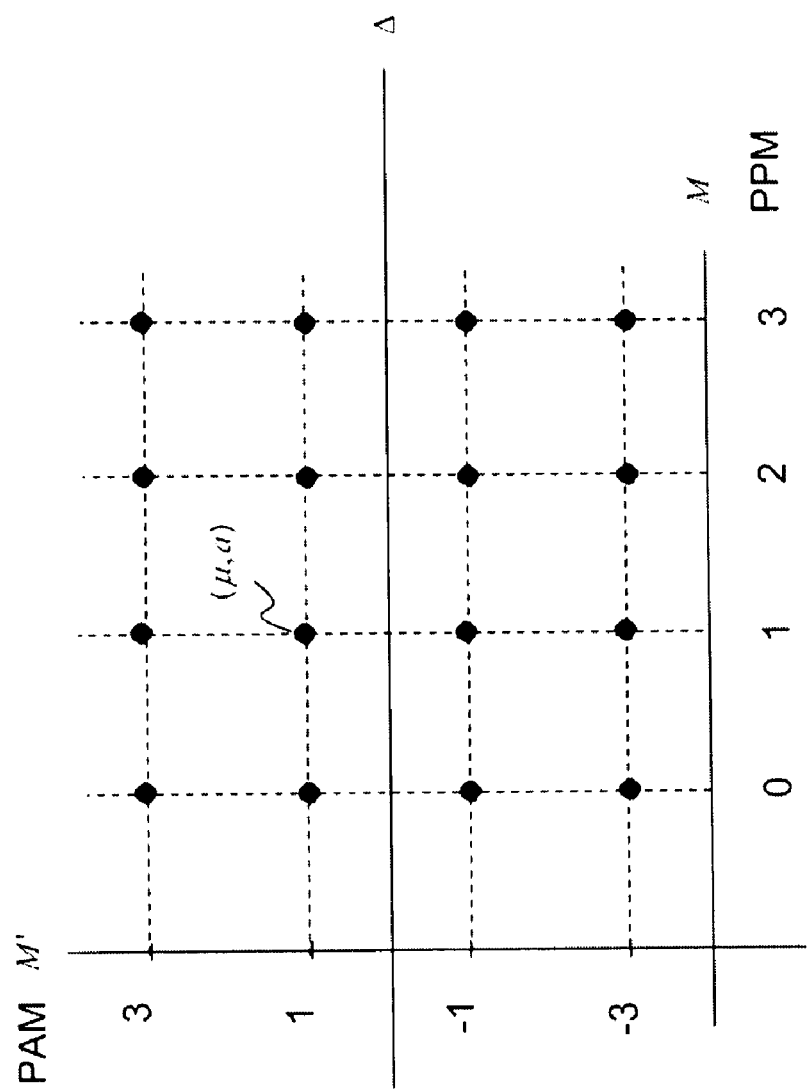
FIG. 3 represents an example of M-PPM-M'-PAM constellation.

The matrix $\Omega$, of size M×M, represents the combination of a permutation operation $\omega$ of the modulation positions of the M-PPM alphabet and a symmetry (or flip) operation $\pi$ of the M'-PAM alphabet for one of the modulation positions. The flip operation may precede or follow the permutation operation, in other words respectively $\Omega=\omega\circ\pi$ or $\Omega=\pi\circ\omega$. Permutation of modulation positions designates any bijection of all of the modulation positions $\{0, \ldots, M-1\}$ on itself, with the exception of the identity. Symmetry or flip operation of the M'-PAM alphabet designates the operation $\pi$ such that: $\pi(\alpha)=-\alpha$ where $\alpha\in\{2m'-1-M'|m'=1,\ldots,M'\}$. In FIG. 3 is represented the axis $\Delta$ of the M'-PAM alphabet symmetry, it being understood that the flip around this axis is only carried out for one of the PPM positions.

Given that the matrix $\Omega$ is unitary, the average energy per transmission antenna is the same for all the transmission antennas.

Since the components of the information symbols are real, the space time code defined by (13) is $\sigma_l$ real. Due to the absence of constraints on the information symbols, P independent symbols are transmitted during P PCUs and the rate of the space time code is consequently single.

By way of example, if the abovementioned permutation operation $\omega$ is a simple circular shift, the matrix $\Omega$ may be written:

$$\Omega = \begin{pmatrix} 0_{1\times M-1} & -1 \\ I_{M-1\times M-1} & 0_{M-1\times 1} \end{pmatrix} = \begin{pmatrix} 0 & 0 & \cdots & 0 & -1 \\ 1 & 0 & \cdots & 0 & 0 \\ 0 & 1 & 0 & \ddots & \vdots \\ \vdots & \ddots & \ddots & \ddots & 0 \\ 0 & \cdots & 0 & 1 & 0 \end{pmatrix} \quad (14)$$

where $I_{M-1\times M-1}$ is the identity matrix of size M−1, $0_{1\times M-1}$ is the zero row vector of size M−1, $0_{M-1\times 1}$ the zero column vector of size M−1. The flip operation is carried out here on the position M−1 if it precedes the permutation and on the position 1 if it follows it.

By way of illustration, the form of the space time matrix (13) may be explained in the case where $\omega$ is a simple circular shift (14):

$$C = \begin{pmatrix} \sigma_{1,0} & \sigma_{2,0} & \cdots & \sigma_{P,0} \\ \sigma_{1,1} & \sigma_{2,1} & \cdots & \sigma_{P,1} \\ \vdots & \vdots & \cdots & \vdots \\ \sigma_{1,M-1} & \sigma_{2,M-1} & \cdots & \sigma_{P,M-1} \\ -\sigma_{P,M-1} & \sigma_{1,0} & \ddots & \vdots \\ \sigma_{P,0} & \sigma_{1,1} & \ddots & \vdots \\ \vdots & \vdots & \ddots & \vdots \\ \sigma_{P,M-2} & \sigma_{1,M-1} & \ddots & \vdots \\ \vdots & \ddots & \ddots & \sigma_{2,0} \\ \vdots & \ddots & \ddots & \sigma_{2,1} \\ \vdots & \ddots & \ddots & \vdots \\ \vdots & \ddots & \ddots & \sigma_{2,M-1} \\ -\sigma_{2,M-1} & \cdots & -\sigma_{P,M-1} & -\sigma_{1,0} \\ \sigma_{2,0} & \cdots & \sigma_{P,0} & \sigma_{1,1} \\ \vdots & \cdots & \vdots & \vdots \\ \sigma_{2,M-2} & \cdots & \sigma_{P,M-2} & \sigma_{1,M-1} \end{pmatrix} \quad (15)$$

where $\sigma_l=(\sigma_{l,0}\ \sigma_{l,1}\ \ldots\ \sigma_{l,M-1})^T$, $l=1,\ldots,P$ with $\sigma_{l,m}\alpha_l\delta=(m-\mu_l)$ where $\alpha_l$ is an element of the M'-PAM alphabet, in other words $\alpha_l\in\{-M'+1,\ldots,M'-1\}$, $\mu_l$ is the modulation position relative to the symbol $\sigma_l$ and $\delta$ is the Dirac symbol. Given that $-\alpha_l$ is also an element of the M'-PAM alphabet, $\Omega\sigma_l$ is also an element of the M-PPM-M'-PAM modulation alphabet.

The particular case where the system is bi-antenna (P=2) will now be considered. The matrix C then has the following form:

$$C = \begin{pmatrix} \sigma_1 & \sigma_2 \\ \Omega\sigma_2 & \sigma_1 \end{pmatrix} \quad (16)$$

By definition, the code is at maximum diversity if for any pair of separate matrices C,C' of the code, $\Delta C=C-C'$ is of full rank, in other words if:

$$\Delta C = \begin{pmatrix} a_1 & a_2 \\ \Omega a_2 & a_1 \end{pmatrix} \quad (17)$$

where $a_1=\sigma_1-\sigma'_1$ and $a_2=\sigma_2-\sigma'_2$, is of full rank.

The matrix $\Delta C$ may be written in the developed form:

$$\Delta C = \begin{pmatrix} a_{1,0} & a_{2,0} \\ \vdots & \vdots \\ a_{1,M-1} & a_{2,M-1} \\ -a_{2,M-1} & a_{1,0} \\ \vdots & \vdots \\ a_{2,M-2} & a_{1,M-1} \end{pmatrix} \quad (18)$$

where it has been assumed without loss of generality that $\Omega$ has the form given in (14) and $\alpha_{l,m}=\sigma_{l,m}-\sigma'_{l,m}$, l=1,2, m=0,...,M−1.

The matrix $\Delta C$ is not at full rank if these two column vectors are co-linear, in other words if a non zero scalar $\lambda$ exists, such that:

$a_{1,m}=\lambda a_{2,m}$, m=0,...,M−1 and $a_{2,M-1}=-\lambda a_{1,0},\ a_{2,0}=\lambda a_{1,1},\ \ldots,\ a_{2,M-2}=\lambda a_{1,M-1}$ (19)

It is deduced from this that:

$$\alpha_{2,M-1} = -\lambda^2 \alpha_{2,0} = -\lambda^4 \alpha_{2,1} = \ldots = -\lambda^{2M} \alpha_{2,M-1}$$

and, in a more general manner:

$$\alpha_{2,m} = -\lambda^{2M} \alpha_{2,m}, \; m=0, \ldots, M-1 \quad (20)$$

in other words, given the fact that $\lambda$ is real, the vectors $a_1$ and $a_2$ are necessarily zero, in other words $C=C'$.

The space time code is consequently at maximum diversity for P=2, whatever the values of $M \geq 2$ and $M' \geq 1$.

In a more general manner, it can be shown that for a given number of antennas P, the maximum diversity is obtained from the moment that the number of modulation positions M of the M-PPM-M'-PAM alphabet is sufficiently high, more precisely from the moment that:

$$M - d(M) \geq P \quad (21)$$

where d(M) is defined by:
  d(M)=0 if M is a power of 2;
  d(M) is the greatest divisor of M (apart from M) such that the ratio M/d(M) is an odd number;

For example, for $M=2^K$, the maximum diversity is attained from the moment that the number M of PPM positions is greater than or equal to the number P of antennas.

According to a second example, if M is a prime number, d(M)=1 and the maximum diversity is obtained from the moment that $M \geq P+1$.

It should be noted that, subject to respecting the constraint (21), the space time code defined by (13) (to within a permutation of its rows and its columns) is at maximum diversity whatever the value of $M' \geq 1$.

It is essential to note that the matrix $\Omega$ leaves invariant the M-PPM-M'-PAM modulation constellation from the moment that $M' \geq 2$. This property guarantees that the level of PAPR of the MIMO system using the space time code defined by (13) (to within a permutation of its rows and its columns) is identical to that of a single antenna system using the same configuration.

In the particular case M'=1, the M-PPM-M'-PAM symbols are de facto elements of a M-PPM alphabet, in other words vectors with M components, all zero with the exception of one equal to 1. Given that the matrix $\Omega$ performs not only a permutation of M modulation positions but also a symmetry operation, certain elements of the matrix C may have a component equal to −1, leading to an extension of the initial modulation constellation and an increment in the level of PAPR compared to a single antenna configuration. However, the PAPR level may be maintained identical at the cost of a slight reduction in the rate of the system.

Indeed, if one notes $m_\pm$ the PPM position for which the flip operation $\pi$ applies, it is sufficient to provide that the symbols $\sigma_2, \ldots, \sigma_P$ cannot have a component equal to 1 in position $m_\pm$. Conversely, the symbol $\sigma_1$ not being multiplied by the matrix $\Omega$, it is not subjected to this constraint. For example, if the matrix $\Omega$ has the form given in (14), the symbols $\sigma_2, \ldots, \sigma_P$ will not be able to occupy the modulation position $m_\pm = M-1$.

The code rate, expressed in number of bits per PCU is then reduced to:

$$R = \frac{\log_2(M) + (P-1)\log_2(M-1)}{P \log_2(M)} \quad (22)$$

The term in the denominator represents the relative rate with P single antenna systems. The term $(P-1)\log_2(M-1)$ in the numerator corresponds to the contribution of the symbols $\sigma_2, \ldots, \sigma_P$/the term $\log_2(M)$ corresponding to the contribution of the symbol $\sigma_1$.

It will be noted that $R \leq 1$ and that R is an increasing function of M and a decreasing function of P. Therefore, for a given number P of antenna, if the space time code C use M-PPM symbols (in other words if M'=1), the code rate will be virtually unitary for a high number of modulation positions. By way of example, for a MIMO system with two antennas, a rate R=0.97 is attained for a 8-PPM modulation alphabet.

The case of a MIMO transmission system with two antennas using a space time code according to the invention such that $$C = \begin{pmatrix} \sigma_1 & \sigma_2 \\ \Omega \sigma_2 & \sigma_1 \end{pmatrix}$$

will now be considered. It will moreover be assumed that the system uses a TH-UWB signal, as defined in (8). The space time code modulates this signal and is transmitted during two consecutive uses of the channel (PCU). During the first use, the antenna 1 transmits a first frame, i.e. with the notations (8) and (15):

$$s_1(t) = \sum_{n=0}^{N_s-1} \sum_{m=0}^{M-1} \sigma_{1,m} w(t - nT_s - c_k(n)T - m\varepsilon) \quad (23)$$

$$= \sum_{n=0}^{N_s-1} \sigma_{1,\mu_1} w(t - nT_s - c(n)T_c - \mu_1 \varepsilon)$$

where $\mu_1$ is the modulation position relative to the symbol $\sigma_1$; and the antenna 2 simultaneously transmits a first frame:

$$s_2(t) = \sum_{n=0}^{N_s-1} \sum_{m=0}^{M-1} \sigma_{2,m} w(t - nT_s - c(n)T_c - m\varepsilon) \quad (24)$$

$$= \sum_{n=0}^{N_s-1} \sigma_{2,\mu_2} w(t - nT_s - c(n)T_c - \mu_2 \varepsilon)$$

where $\mu_2$ is the modulation position relative to the symbol $\sigma_2$.

During the second use of the channel, the antenna 1 transmits a second frame:

$$s_1(t) = \sum_{n=0}^{N_s-1} \sum_{m=0}^{M-1} -\sigma_{2,\omega'(m)} w(t - nT_s - c(n)T_c - m\varepsilon) \quad (25)$$

$$= \sum_{n=0}^{N_s-1} -\sigma_{2,\omega(\mu_2)} w(t - nT_s - c(n)T_c - \omega(\mu_2)\varepsilon)$$

where $\omega$ is the permutation of the set $\{0, 1, \ldots, M-1\}$ associated with $\Omega = \omega \circ \pi$ (where "$\circ$" is the composition operation) and $\omega' = \omega^{-1}$;

and the antenna 2 transmits simultaneously a second frame:

$$s_2(t) = \sum_{n=0}^{N_s-1} \sum_{m=0}^{M-1} \sigma_{1,m} w(t - nT_s - c(n)T_c - m\varepsilon) \quad (26)$$

$$= \sum_{n=0}^{N_s-1} \sigma_{1,\mu_1} w(t - nT_s - c(n)T_c - \mu_1 \varepsilon)$$

It is clear for those skilled in the art that similar expressions would be obtained by using a DS-TH-UWB signal according to the expression (9) instead of a TH-UWB signal according to the expression (8).

Figure 4:
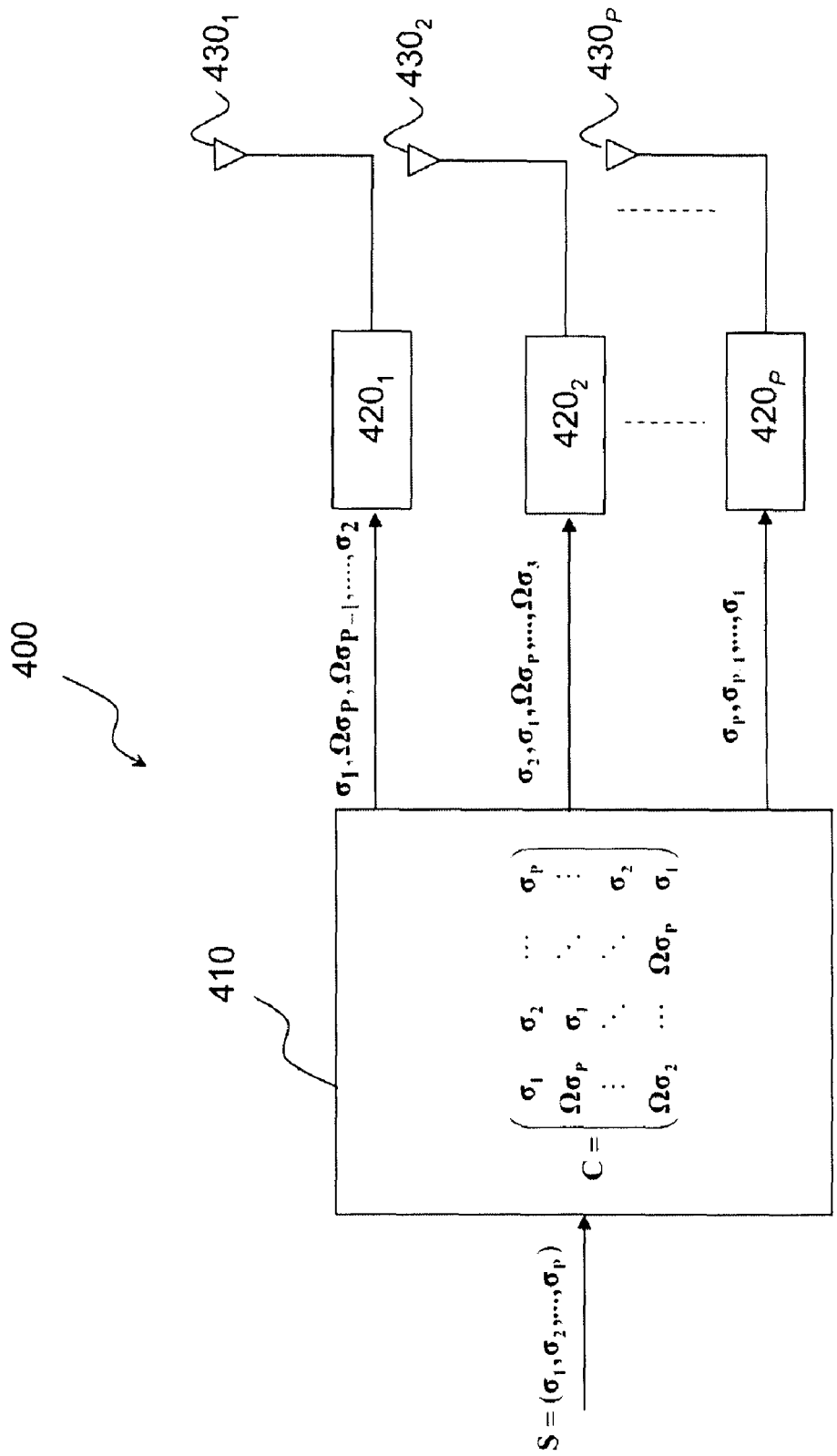
FIG. 4 schematically represents a multi-antenna UWB transmission system according to one embodiment of the invention.

FIG. 4 illustrates an example of transmission system using the space time coding according to the invention.

The system 400 receives information symbols by block $S=(\sigma_1, \sigma_2, \ldots, \sigma_P)$ where the $\sigma_l$, $l=1, \ldots, P$, with $P>1$ are symbols of a M-PPM-M'-PAM constellation. Alternatively, the information symbols may come from another constellation Q-ary with Q=MM' on condition of previously undergoing a transcoding (mapping) in said M-PPM-M'-PAM constellation. The information symbols may also come from one or a plurality of operations well known to those skilled in the art such as source coding, convolutional type channel coding, by block or instead series or parallel turbo coding, interlacing, etc.

The block of information symbols $S=(\sigma_1, \sigma_2, \ldots, \sigma_P)$ undergoes a coding operation in the space time coder 410. More precisely, the module 410 calculates the coefficients of the matrix C obeying the expression (13) or a variant obtained by permutation of its rows and/or its columns as indicated previously. The P column vectors (vectors with M components) of the first row of C, representing P PPM symbols are transmitted respectively to the UWB modulators $420_1, \ldots, 420_P$ to generate the first frame, then the P column vectors of the second row of C, to generate the second frame etc. up to the final row of column vectors to generate the final frame. The UWB modulator $420_1$ generates from the column vectors $\sigma_1, \Omega\sigma_P, \Omega\sigma_P, \ldots, \sigma_2$, the corresponding modulated pulse UWB signals. In the same way, the UWB modulator $420_2$ generates from the vectors $\sigma_2, \sigma_1, \Omega\sigma_P, \ldots, \Omega\sigma_3$ the corresponding modulated pulse UWB signals, and so on up to the UWB modulator $420_P$ from the vectors $\sigma_P, \sigma_{P-1}, \ldots, \sigma_1$.

For example, if one uses, for a bi-antenna system (P=2), the space time coding matrix (13) with the matrix $\Omega$ defined in (14) and a modulation support signal of TH-UWB type, the UWB modulator $320_1$ will successively provide the signals (23) and (25) whereas the UWB modulator $320_2$ will successively provide the signals (24) and (26). The pulse UWB signals serving as support to the modulation may be alternatively of the DS-UWB or TH-DS-UWB type. In all cases, the pulse UWB signals thereby modulated are then transmitted to the radiative elements $430_1$ to $430_P$. These radiative elements may be UWB antenna or instead laser diodes or LEDs, operating for example in the infrared domain, associated with electro-optical modulators. The transmission system proposed may then be used in the field of wireless optical telecommunications.

The UWB signals transmitted by the system illustrated in FIG. 4 may be processed by a multiple antenna receiver in a conventional manner. The receiver may for example comprise a RAKE type of correlation stage followed by a decision stage, using for example a sphere decoder known to those skilled in the art.

The invention claimed is:

1. Method of space time coding for UWB transmission system comprising a plurality P of radiative elements, said method comprising:

coding a block of information symbols $S=(\sigma_1,\sigma_2,\ldots,\sigma_P)$ belonging to a M-PPM-M'-PAM modulation alphabet with $M \geq 2$, as a sequence of vectors, the components of a vector being intended to position and amplitude modulate a pulse UWB signal for a given radiative element of said system and a use of transmission channel, each component of a vector corresponding to a PPM modulation position, characterised in that said vectors are obtained from elements of the matrix:

$$C = \begin{pmatrix} \sigma_1 & \sigma_2 & \ldots & \sigma_P \\ \Omega\sigma_P & \sigma_1 & \ddots & \vdots \\ \vdots & \ddots & \ddots & \sigma_2 \\ \Omega\sigma_2 & \ldots & \Omega\sigma_P & \sigma_1 \end{pmatrix}$$

a row of the matrix corresponding to a use of the transmission channel and a column of the matrix corresponding to a radiative element, the matrix C being defined to within a permutation of its rows and/or its columns and $\Omega$ being defined as the combination of a permutation ($\omega$) of the modulation positions of the M-PPM alphabet and a symmetry operation ($\pi$) of the M-PAM modulation alphabet for one of the modulation positions ($m_\pm$).

2. Method of space time coding according to claim 1, wherein said permutation operation ($\omega$) is a circular permutation of said modulation positions.

3. Method of space time coding according to claim 2, wherein said circular permutation is a circular shift of said modulation positions.

4. Method of space time coding according to claim 1, wherein the number P of radiative elements and the number M of modulation positions confirm $M-d(M) \geq P$ where $d(M)$ is defined by $d(M)=0$ in the case where M is a power of 2 and as the highest divisor of M such that the ratio $M/d(M)$ is an odd number, in the other cases.

5. Method of space time coding according to claim 1, wherein $M'=1$, the symbols $\sigma_1, \sigma_2, \ldots, \sigma_P$ then belonging to said M-PPM modulation alphabet and the symbols $\sigma_2, \ldots, \sigma_P$ can occupy all of the modulation positions save that ($m_\pm$) to which said symmetry operation applies.

6. Method of space time coding according to claim 1, wherein the radiative elements are UWB antenna.

7. Method of space time coding according to claim 1, wherein the radiative elements are laser diodes or light emitting diodes.

8. Method of space time coding according to claim 6, wherein said pulse signal is a TH-UWB signal.

9. Method of space time coding according to claim 6, wherein said pulse signal is a DS-UWB signal.

10. Method of space time coding according to claim 6, wherein said pulse signal is a TH-DS-UWB signal.

11. UWB transmission system comprising:
a plurality of radiative elements;
coding means to code a block of information symbols $S=(\sigma_1, \sigma_2, \ldots, \sigma_P)$ belonging to a M-PPM-M'-PAM modulation alphabet with $M \geq 2$, as a sequence of vectors, each vector being associated with a given use of the transmission channel and a radiative element, each component of a vector corresponding to a PPM modulation position, said vectors being obtained from elements of the matrix:

$$C = \begin{pmatrix} \sigma_1 & \sigma_2 & \ldots & \sigma_P \\ \Omega\sigma_P & \sigma_1 & \ddots & \vdots \\ \vdots & \ddots & \ddots & \sigma_2 \\ \Omega\sigma_2 & \ldots & \Omega\sigma_P & \sigma_1 \end{pmatrix}$$

a row of the matrix corresponding to a use of transmission channel and a column of the matrix corresponding to a radiative element, the matrix C being defined to within a permutation of its rows and/or its columns and $\Omega$ being defined as the combination of a permutation ($\omega$) of the modulation positions of the M-PPM alphabet and a symmetry operation ($\pi$) of the M'-PAM modulation alphabet for one of the modulation positions ($m_\pm$);

a plurality of modulators to position and amplitude modulate a pulse UWB signal, each modulator being associated with a radiative element and position and amplitude modulating said signal, during a use of the transmission channel, by the components of the vector associated with said radiative element and said use of the channel; each radiative element being adapted to emit the signal thereby modulated by said associated modulator.

12. UWB transmission system according to claim 11, wherein the number P of radiative elements and the number M of modulation positions confirm $M-d(M) \geqq P$ where $d(M)$ is defined by $d(M)=0$ in the case where M is a power of 2 and as the greatest divisor of M such that the ratio $M/d(M)$ is an odd number, in the other cases.

* * * * *